US011509527B1

(12) United States Patent
Chunduru Venkata et al.

(10) Patent No.: US 11,509,527 B1
(45) Date of Patent: Nov. 22, 2022

(54) ASSISTED AND CONTEXT-DRIVEN NETWORK CHANGES

(71) Applicant: Verizon Patent and Licensing Inc., Basking Ridge, NJ (US)

(72) Inventors: Sivanaga Ravi Kumar Chunduru Venkata, Irving, TX (US); Kirk Campbell, Long Valley, NJ (US); Ajaykumar Kalla, Frisco, TX (US); Manish Srivastava, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/315,514

(22) Filed: May 10, 2021

(51) Int. Cl.
*H04L 41/0813* (2022.01)
*H04L 41/0873* (2022.01)
*H04L 67/51* (2022.01)

(52) U.S. Cl.
CPC ...... *H04L 41/0813* (2013.01); *H04L 41/0873* (2013.01); *H04L 67/51* (2022.05)

(58) Field of Classification Search
CPC .. H04L 41/0813; H04L 41/0873; H04L 67/16
USPC ........................................................ 709/221
See application file for complete search history.

(56) References Cited

U.S. PATENT DOCUMENTS

| 6,195,689 B1* | 2/2001 | Bahlmann | H04L 41/0806 709/217 |
| 2004/0215649 A1* | 10/2004 | Whalen | H04L 41/0893 |
| 2005/0075831 A1* | 4/2005 | Ilic | G06F 11/0709 702/179 |
| 2006/0126521 A1* | 6/2006 | Hyndman | H04L 41/12 370/248 |
| 2014/0137259 A1* | 5/2014 | Chen | G06F 21/105 726/26 |
| 2014/0344462 A1* | 11/2014 | Pabari | H04L 41/00 709/226 |
| 2015/0317595 A1* | 11/2015 | De | G06F 9/4887 705/7.15 |

FOREIGN PATENT DOCUMENTS

WO  WO-2014145818 A1 * 9/2014 ............ G06F 11/079

* cited by examiner

*Primary Examiner* — Zi Ye

(57) ABSTRACT

Systems and methods described herein provide an assisted network change service. A network device stores a record of network resources for a customer network and generates, based on the record, a visual representation of the network topology for a selected site of the customer network. The network device receives, from the customer, input for a change to configuration parameters of one of the network resources and verifies if the change to the configuration parameters is compatible with other settings in the customer network. When the change to the configuration parameters is compatible with other settings in the customer network, the network device generates a change request based on the configuration parameters and invokes provisioning to implement the change request for the customer network.

20 Claims, 9 Drawing Sheets

Locations

Customer XYZ

| Location | Region | Address | Products | Actions |
|---|---|---|---|---|
| ☐ Albany, NY | North America | 123 XYZ Street | ROUT  SEC | View Topology |
| ☐ Albany, NY | North America | 456 ABC Street | SEC | View Topology |
| ☐ Boston, MA | North America | 567 PQR Street | SEC  SDWAN | View Topology |
| ☐ Cambridge, MA | North America | 135 FBH Street | ROUT | View Topology |
| ☐ Newark, DE | North America | 346 BBB Street | SEC | View Topology |

Search 🔍

Show 5 per page

Page < 1 > of 2

410 — (table)
412 — (View Topology buttons)

FIG. 4A

ASSISTED AND CONTEXT-DRIVEN NETWORK CHANGES

BACKGROUND

Service providers are deploying private networks utilizing configurable cloud-based wide area network (WAN) services. These private networks, also referred to as enterprise networks, may be complex and have multiple locations and/or data centers. Multi-Access Edge Computing (MEC) services may also be used to provide services inside and outside of the private network. Making changes (e.g., configuration changes, policy changes, etc.) to network functions and networks at enterprise and/or MEC deployments is quite complex and challenging, given the ever-increasing number of applications, user-types, sites, and devices proliferating throughout an enterprise. Implementing such changes typically requires network expertise and manual interactions.

BRIEF DESCRIPTION OF THE DRAWINGS

FIGS. 4A-4E are examples of user interfaces for the assisted network change service that may be presented via a customer portal;

DETAILED DESCRIPTION OF EXAMPLE EMBODIMENTS

Figure 1:
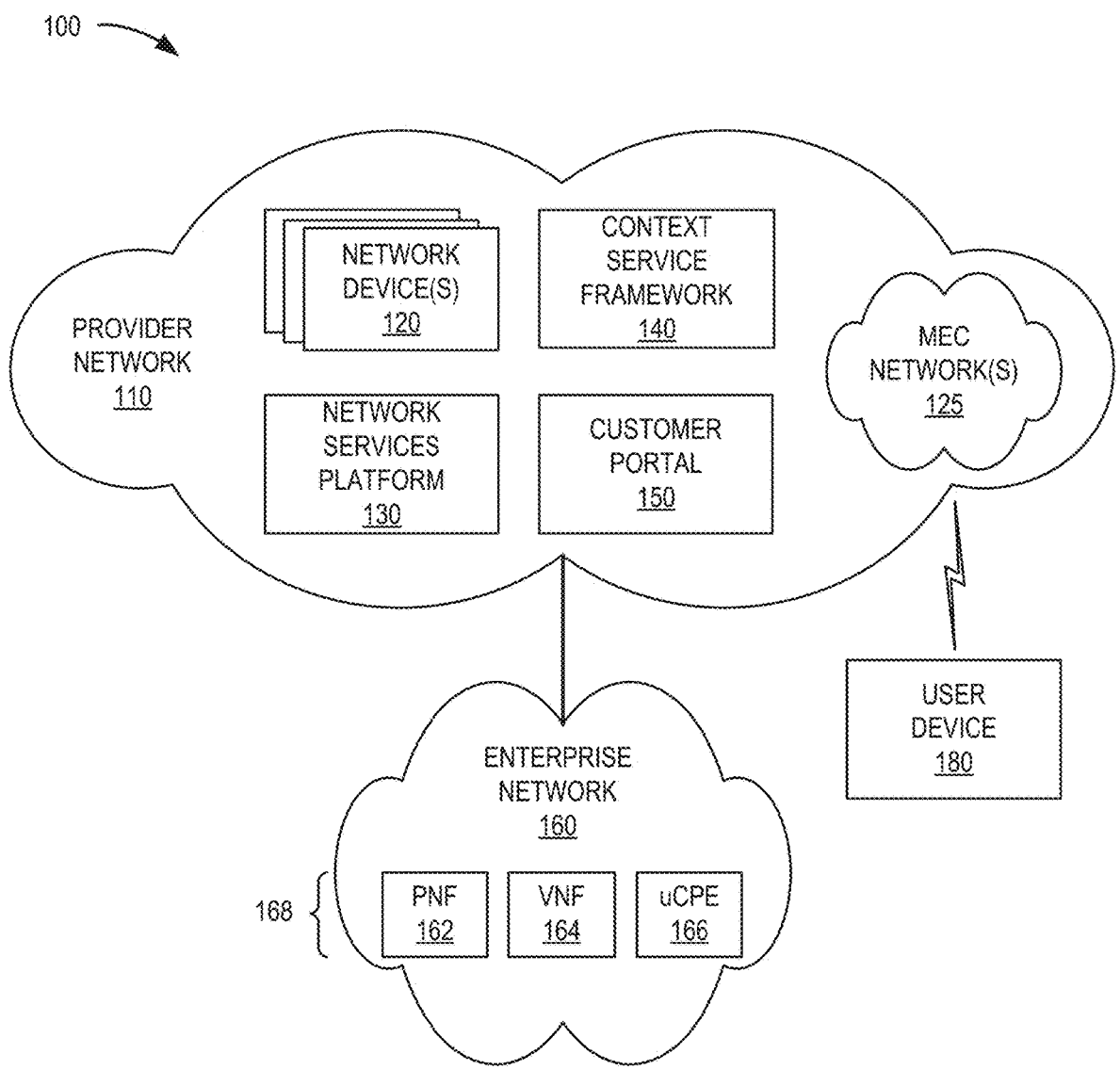
FIG. 1 is a diagram illustrating a network environment according to an implementation described herein.

The following detailed description refers to the accompanying drawings. The same reference numbers in different drawings may identify the same or similar elements.

In fully-managed enterprise solutions, all aspects of device management such as installation, configuration, administration, and run time operations are performed by a network service provider. With fully-managed solutions, a change management system is typically used in which customers (e.g., enterprise network administrators or users of Multi-Access Edge Computing (MEC) services) submit proposals (e.g., change requests) to make changes to software defined network (SDN) configurations. The change request process typically includes a complex chain of sub-processes that can take several days or weeks to complete. For example, in existing change management processes, a customer may submit a change request ticket that is assigned to an operations team for the service provider. The operations team would schedule and reserve a time slot to address the ticket. At the scheduled time, the operations team may conduct an analysis for the ticket and change the configuration. After the configuration change, the team would validate the changes and notify the customer by closing the change request ticket.

As a result of this conventional change management process, enterprise network customers are not given an adequate understanding of their network topology. For example, customers may not able to visualize how their network functions are connected or readily understand the impact of particular changes on the overall customer network. With additional context of network visualizations, along with structured guidance, the customers may be able to initiate some network changes that can be safely and automatically implemented without the delays of a conventional change management process.

Enterprise network customers can benefit from a self-service model, referred to herein as an assisted network change service, which would allow customers to make their own changes assisted by an intelligent backend that builds a context on each site and drives recommendations. For a given customer, the assisted network change service may provide automatic construction of network topology using real-time discovery. Based on the discovered network topology, the assisted network change service may provide recommendations for optimized network performance. According to an implementation, the assisted network change service may provide intelligent and assisted tools to make dynamic changes to virtual network function (VNF) service chains. Additionally, the assisted network change service may provide for automatic rollback to a last known VNF service chain design. The assisted network change service may further provide intelligent recommendations for managing the network resources.

As used herein, the terms "user," "network administrator," and/or "customer" may be used interchangeably. Also, the terms "user," "network administrator" and/or "customer" are intended to be broadly interpreted to include a user device or a user of a user device.

FIG. 1 is a diagram of an exemplary environment 100 in which the systems and/or methods, described herein, may be implemented. As shown in FIG. 1, environment 100 may include a provider network 110 that provide services to an enterprise network 160. According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communication connection via a link may be direct or indirect. For example, an indirect communication connection may involve an intermediary device and/or an intermediary network not illustrated in FIG. 1. Additionally, the number and the arrangement of links illustrated in environment 100 are exemplary.

Provider network 110 may generally include one or more wired, wireless and/or optical networks that are capable of receiving and transmitting data, voice and/or video signals. For example, provider network 110 may include one or more access networks, IP multimedia subsystem (IMS) networks, core networks, or other networks. The access network may include a wireless communications network that connects users/customers (e.g., using user device 180) to other portions of provider network 110 (e.g., the core network). In one example, the access network may include a Fifth Generation (5G) access network and/or a long-term evolution (LTE) access network. Provider network 110 may further include one or more satellite networks, one or more packet switched networks, such as an IP-based network, a local area network (LAN), a wide area network (WAN), a personal area network (PAN) (e.g., a wireless PAN), a wireless local area network (WLAN), an intranet, or another type of network that is capable of transmitting data. As descried further herein, provider network 110 may also include a Multi-Access Edge Computing (MEC) network associated with a core network or the access network controlled by the core network. In an exemplary implementation, provider network 110 may represent a network associated with a service provider that provides various services, such as IP-related services, value added services, etc.

In the example of FIG. 1, provider network 110 may include network devices 120. Each network device 120 may be configured to perform network functions in provider network 110. For example, network device 120 may include a switch, a router, a firewall, a gateway, a Network Address Translation (NAT) device, a Reconfigurable Optical Add-Drop Multiplexer (ROADM), and/or another type of network device. Some or all of the functionality of network device 120 may be virtualized as a VNF in provider network 110. Depending on the implementation, network 110 may include other types of network devices 120, such as, for example, a base station (e.g., a next-generation NodeB, an evolved NodeB, etc.), a gateway device, a support node, a serving node, a core access and mobility management function (AMF), a session management function (SMF), a policy control function (PCF), as well other network devices that provide various network-related functions and/or services, such as charging and billing, security, authentication and authorization, network policy enforcement, management of subscriber profiles, and/or other functions and/or services that facilitate the operation of the core network. Network devices 120 may receive, store, and enforce policies for end devices in enterprise network 160 (e.g., network function (NF) instances 168, described below) and other user devices (e.g., user device 180).

According to implementations describe herein, provider network 110 may also include a MEC network 125, a network services platform 130, a context service framework 140, and a customer portal 150. MEC network 125, network services platform 130, context service framework 140, and a customer portal 150 may include network devices to implement an assisted network change service for enterprise network 160 and are described further below.

Enterprise network 160 (also referred to herein as a "customer network") may include a network that receives services from provider network 110. Enterprise network 160 may include a local area network (LAN), a WAN, or a combination of networks that provide network access to devices in provider network 110. In one implementation, enterprise network 160 may include a network interconnecting one or more physical network functions (PNF) 162, virtual network functions (VNF) 164 or cloud network functions (CNF), and/or universal customer premises equipment (uCPE) 166 (referred to collectively herein as "NF instances 168" or "NFs 168"). NF instances 168 may be provided by different suppliers/vendors for a service provider and may be configured using vendor-specific APIs. In another implementation, enterprise network 160 may include application servers for user devices 180 (e.g., machine-type communication (MTC) devices, mobile devices, etc.). The application servers may, for example, receive and process data from user devices 180. In another implementation, enterprise network 160 may include gateway (GW) routers (e.g., customer premises equipment) that act as a secure gateway for devices within enterprise network 160. In still another implementation, enterprise network 160 may utilize deployed network functions in MEC network 125.

MEC network 125 may include one or more configurable devices to provide MEC services to enterprise network 160 and/or UE devices 180. A MEC service may include, for example, a low-latency microservice associated with a particular application, such as, for example, a user authentication microservice, a navigation microservice, an online shopping microservice, data compression, a content delivery microservice, a gaming microservice, a virtual and/or augmented reality microservice, a health monitoring microservice, and/or another type of microservice associated with a low latency requirement. As another example, a MEC microservice may include a microservice associated with a virtualized network function (VNF) of provider network 110.

Network services platform 130 may perform functions to configure available network services for customers (e.g., customer using enterprise network 160, user device 180, etc.). Network services platform 130 may include components to receive change requests, generate service orders and work orders, and provision and orchestrate network services.

Context service framework 140 may provide self-service capabilities for the assisted network change service to enable customers (e.g., network administrators for enterprise network 160) to make changes to enterprise network 160. Context service framework 140 may provide an intelligent backend that builds context on each site of enterprise network 160 and generate recommendations. For a given user/enterprise network 160, context service framework 140 may discover network resources from internal network systems in real time and construct a network topology. Context service framework 140 may automatically generate recommendations to enterprise customers with contextual awareness of customer deployment and load. For example, if a customer adjusts a setting for one network function (e.g., a router capacity), context service framework 140 may identify recommended changes for other impacted network functions (e.g., a security capacity). For implemented changes, context service framework 140 may log the change history and provide for automatic rollback to a known last working configuration, if needed. Information and recommendations from context service framework 140 may be presented to customers on a user interface (UI) via customer portal 150. Context service framework 140 is described further in connection with FIG. 3.

Customer portal 150 may include network devices that provide a web-based interface for a customer (e.g., using user device 180) to access the assisted network change service. Via user device 180, users (e.g., enterprise customers) may access customer portal 150 to manage (e.g., introduce, configure, issue commands, update, monitor, etc.) configurations/policies associated with enterprise network 160. For example, using customer portal 150, customers may manage their SDN device configurations for selected eligible parameters and make changes into SDN device instances 168 by changing the configuration that is managed by the service provider of provider network 110.

User device 180 may include a computational or communication device that is capable of communicating with provider network 110. In one aspect, user device 180 may be used by a customer (e.g., a network administrator) to communicate with network devices 120, network services platform 130, and/or context service framework 140. In another aspect, user device 180 may enable a customer to access customer portal 150 or interact with devices in enterprise network 160. User device 180 may include, for example, a personal communications system (PCS) terminal (e.g., a smartphone that may combine a cellular radiotelephone with data processing and data communications capabilities), a tablet computer, a personal computer, a laptop computer, a gaming console, an Internet television, or other types of computation or communication devices.

According to implementations described herein, context service framework 140 may allow users of customer portal 150 to initiate changes to enterprise network 160. Context service framework 140 provides a network topology to understand interrelated components for enterprise network and has intelligent awareness to identify dependencies that flow from initial changes input by the customer. The context service framework 140 may provide recommendations to users and interface with business systems in network services platform 130 to get costs and approval for selected changes. The context service framework 140 may interface with provisioning to implement approved changes.

Figure 2:
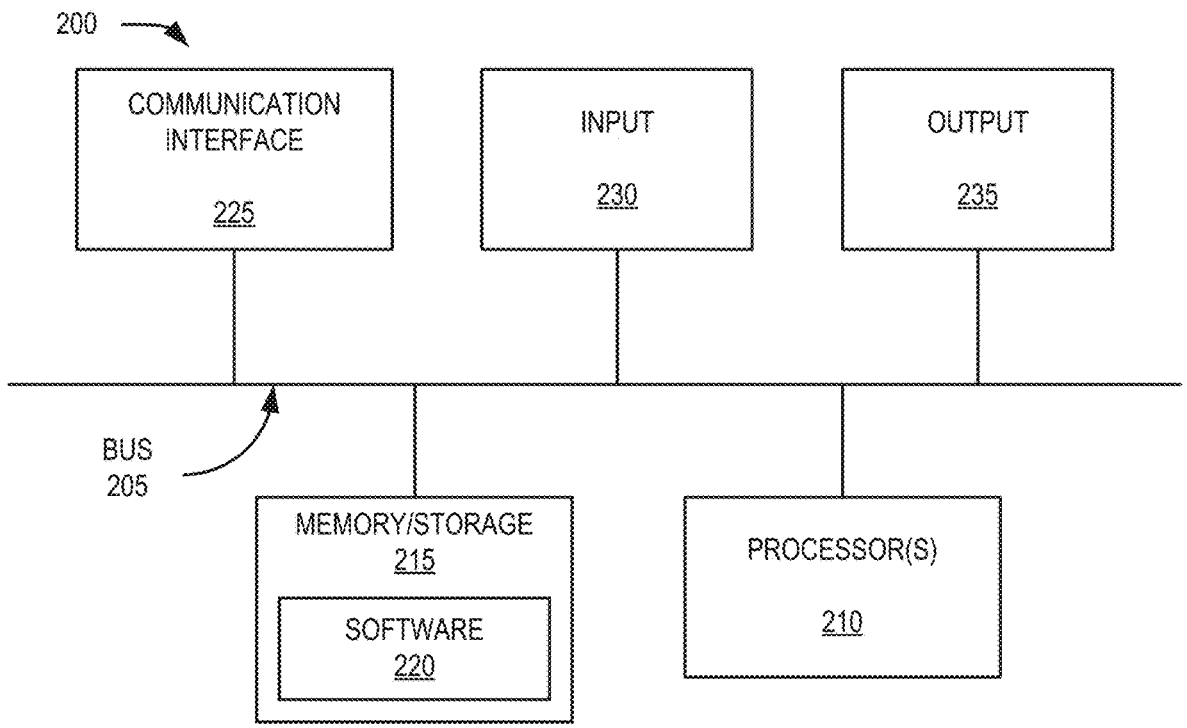
FIG. 2 is a diagram of example components that may be included in one or more of the devices in an assisted network change service.

FIG. 2 is a diagram illustrating exemplary components of a device 200 that may correspond to one or more of the devices described herein. For example, device 200 may correspond to components included in network device 120, network services platform 130, SDN device instance 138, context service framework 140, customer portal 150, and user device 180. As illustrated in FIG. 2, according to an exemplary embodiment, device 200 includes a bus 205, processor 210, memory/storage 215 that stores software 220, a communication interface 225, an input 230, and an output 235. According to other embodiments, device 200 may include fewer components, additional components, different components, and/or a different arrangement of components than those illustrated in FIG. 2 and described herein.

Bus 205 includes a path that permits communication among the components of device 200. For example, bus 205 may include a system bus, an address bus, a data bus, and/or a control bus. Bus 205 may also include bus drivers, bus arbiters, bus interfaces, and/or clocks.

Processor 210 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 210 may be implemented as hardware (e.g., a microprocessor, etc.), a combination of hardware and software (e.g., a SoC, an ASIC, etc.), may include one or multiple memories (e.g., cache, etc.), etc. Processor 210 may be a dedicated component or a non-dedicated component (e.g., a shared resource).

Processor 210 may control the overall operation or a portion of operations performed by device 200. Processor 210 may perform operations based on an operating system and/or various applications or computer programs (e.g., software 220). Processor 210 may access instructions from memory/storage 215, from other components of device 200, and/or from a source external to device 200 (e.g., a network, another device, etc.). Processor 210 may perform an operation and/or a process based on various techniques including, for example, multithreading, parallel processing, pipelining, interleaving, etc.

Memory/storage 215 includes one or multiple memories and/or one or multiple other types of storage mediums. For example, memory/storage 215 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 215 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 215 may include a drive for reading from and writing to the storage medium.

Memory/storage 215 may be external to and/or removable from device 200, such as, for example, a Universal Serial Bus (USB) memory stick, a dongle, a hard disk, mass storage, off-line storage, network attached storage (NAS), or some other type of storage medium (e.g., a compact disk (CD), a digital versatile disk (DVD), a Blu-Ray disk (BD), etc.). Memory/storage 215 may store data, software, and/or instructions related to the operation of device 200.

Software 220 includes an application or a program that provides a function and/or a process. Software 220 may include an operating system. Software 220 is also intended to include firmware, middleware, microcode, hardware description language (HDL), and/or other forms of instruction. For example, according to an implementation, software 220 may implement portions of co-management service framework 140 and customer portal 150.

Communication interface 225 permits device 200 to communicate with other devices, networks, systems, devices, and/or the like. Communication interface 225 includes one or multiple wireless interfaces and/or wired interfaces. For example, communication interface 225 may include one or multiple transmitters and receivers, or transceivers. Communication interface 225 may include one or more antennas. For example, communication interface 225 may include an array of antennas. Communication interface 225 may operate according to a protocol stack and a communication standard. Communication interface 225 may include various processing logic or circuitry (e.g., multiplexing/de-multiplexing, filtering, amplifying, converting, error correction, etc.).

Input 230 permits an input into device 200. For example, input 230 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 235 permits an output from device 200. For example, output 235 may include a speaker, a display, a light, an output port, and/or some other type of visual, auditory, tactile, etc., output component. According to some embodiments, input 230 and/or output 235 may be a device that is attachable to and removable from device 200.

Device 200 may perform a process and/or a function, as described herein, in response to processor 210 executing software 220 in a computer-readable medium, such as memory/storage 215. A computer-readable medium may be defined as a non-transitory memory device. A memory device may be implemented within a single physical memory device or spread across multiple physical memory devices. By way of example, instructions may be read into memory/storage 215 from another memory/storage 215 (not shown) or read from another device (not shown) via communication interface 225. The instructions stored by memory/storage 215 cause processor 210 to perform a process described herein. Alternatively, for example, according to other implementations, device 200 performs a process described herein based on the execution of hardware (processor 210, etc.).

Figure 3:
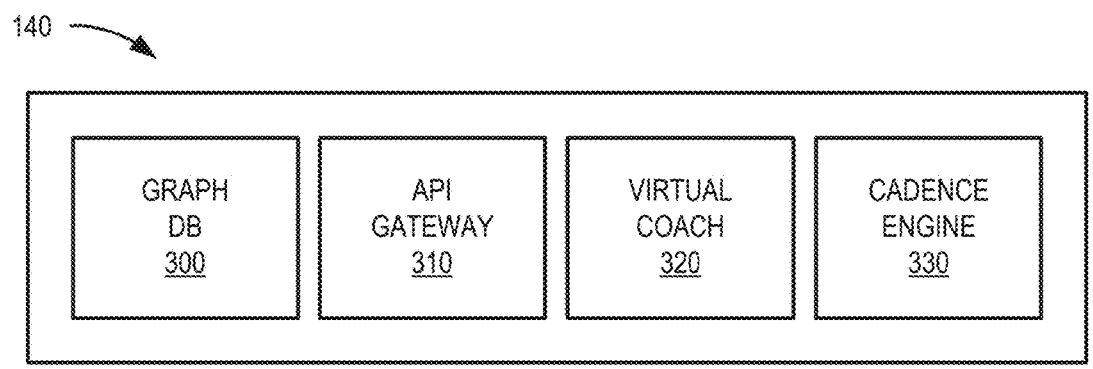
FIG. 3 is a diagram illustrating logical components of an assisted network change service, according to an implementation.

FIG. 3 is a block diagram illustrating some exemplary logical components of context service framework 140. As shown in FIG. 3, context service framework 140 may include a graph database (DB) 300, an API gateway 310, a virtual coach 320, and a cadence engine 330. The components of FIG. 3 may be implemented, for example, by processor 220 in conjunction with memory 230.

Graph database 300 may include a network topology with a linking of all network functions at different sites of each enterprise network 160 supported by provider network 110. Graph database 300 may identify network services for different locations and identify connections between different network resources. Graph database 300 may be updated, for example, by a continuous background process using stored configuration information from network provisioning systems. The continuous updating of graph database and local storage of network resource records enables the assisted network change service to absorb topology changes and reflect changes in customer portal 150 in near real time (e.g., about less than a second or with as little delay as possible). Continuously synchronizing graph database 300 may enable near-real-time network views for customers, instead of waiting for several minutes to obtain accurate depiction of the topology as with a typical network discovery process.

Graph database 300 may also store business rules that define compatibility of different network function settings/parameters (e.g., settings/parameters which a customer may be permitted to change). The business rules may be generated, for example, by product engineering teams and fed to graph database 300. As described further below, the business rules and network topology may be used, for example, by virtual coach 320 to (a) validate that changes requested by a customer are compatible with other network function settings and (b) provide site-specific recommendations for dependencies that flow from initial customer-implemented changes.

API gateway 310 may generally manage the receipt and initial routing of customer requests for the assisted network change service. According to an implementation, API gateway 310 may receive change requests and other requests from customer portal 150. API gateway 310 may direct change requests for the assisted network change service to cadence engine 330.

Virtual coach 320 may interface with customer portal 150 present network topologies from graph database 300 and evaluate user input for network changes. Virtual coach 320 may also apply business rules from graph database 300 to requested changes. In one implementation, virtual coach 320 may apply these rules dynamically to customer choices to prevent incompatible selections or validate compatible selections. For example, the business rules may identify whether certain settings (e.g., low, medium, high, etc.) for one NF service level are compatible with current settings for another NF in an enterprise site. Additionally, virtual coach 320 may identify additional corresponding changes that may be needed to implement an initial change selected by a user. Virtual coach 320 may also provide site-specific recommendations for customer-implemented changes, such as identifying VNF resources impacted due to a security vulnerability.

In another aspect, virtual coach 320 may provide recommendations to a design/operations team for service provider network 110. For example, virtual coach 320 may automatically provide recommendations to the design team for particular customers/sites impacted with identified security vulnerability. Additionally, virtual coach 320 may provide recommendations to an operations team for batched sets to simplify operations (such as patches, upgrades) and obtain maintenance time windows.

Cadence engine 330 may coordinate a workflow and timing to implement change requests received from customer portal 150 (e.g., via API gateway 310). Cadence engine 330 may determine what network components require changes to implement a change request/order. Cadence engine 330 may provide various workflow instructions to update inventory, assign IP addresses, initiate provisioning, and update licensing records. Cadence engine 330 may perform stateful monitoring of the various workflows. For example, cadence engine 330 may automatically pause or adjust workflows in response to delays/failures of another workflow. In another implementation, cadence engine 330 may generate a new/different workflow strategy in response to a failure. Additionally, or alternatively, cadence engine 330 may direct alerts or reported problems to an operations team for manual resolution. Cadence engine 330 may also provide real-time feedback to graph database to provide an ongoing status of change requests (e.g., received, in progress, completed, failed, etc.).

Cadence engine 330 may log a change history for each transaction processed through the assisted network change service. The change history may be used to initiate a graceful fallback to pre-change conditions if there is a deployment failure or other issues implementing a change request. Additionally, or alternatively, the change history may be retrieved, for example, to enable a network service provider to back trace changes if problems occur deploying a given change request.

Although FIG. 3 illustrates certain logical components of context service framework 140, in other implementations, context service framework 140 may include fewer, different, or additional logical components than depicted in FIG. 3. Additionally or alternatively, one or more logical components of risk assessment system 130 may perform functions described as being performed by one or more other logical components.

FIGS. 4A-4E are examples of user interfaces (e.g., graphical user interfaces) for the assisted network change service that may be presented via customer portal 150. The user interfaces in FIGS. 4A-4E may guide an enterprise customer through a self-service change to components of enterprise network 160 using the assisted network change service.

FIG. 4A is an example of a location view UI 410 of enterprise network 160. Location view UI 410 may include an aggregated view of customer products deployed at each location of enterprise network 160. As shown in FIG. 4A, a location may include a region, city, and physical address identifiers. The products at each location may encompass, for example, Virtual services, Physical devices, Private IP (PIP), Secure Cloud Interconnect (SCI), etc. Using, for example, radio buttons 412, a user may select to view the network topology of a location.

Figure 4B:
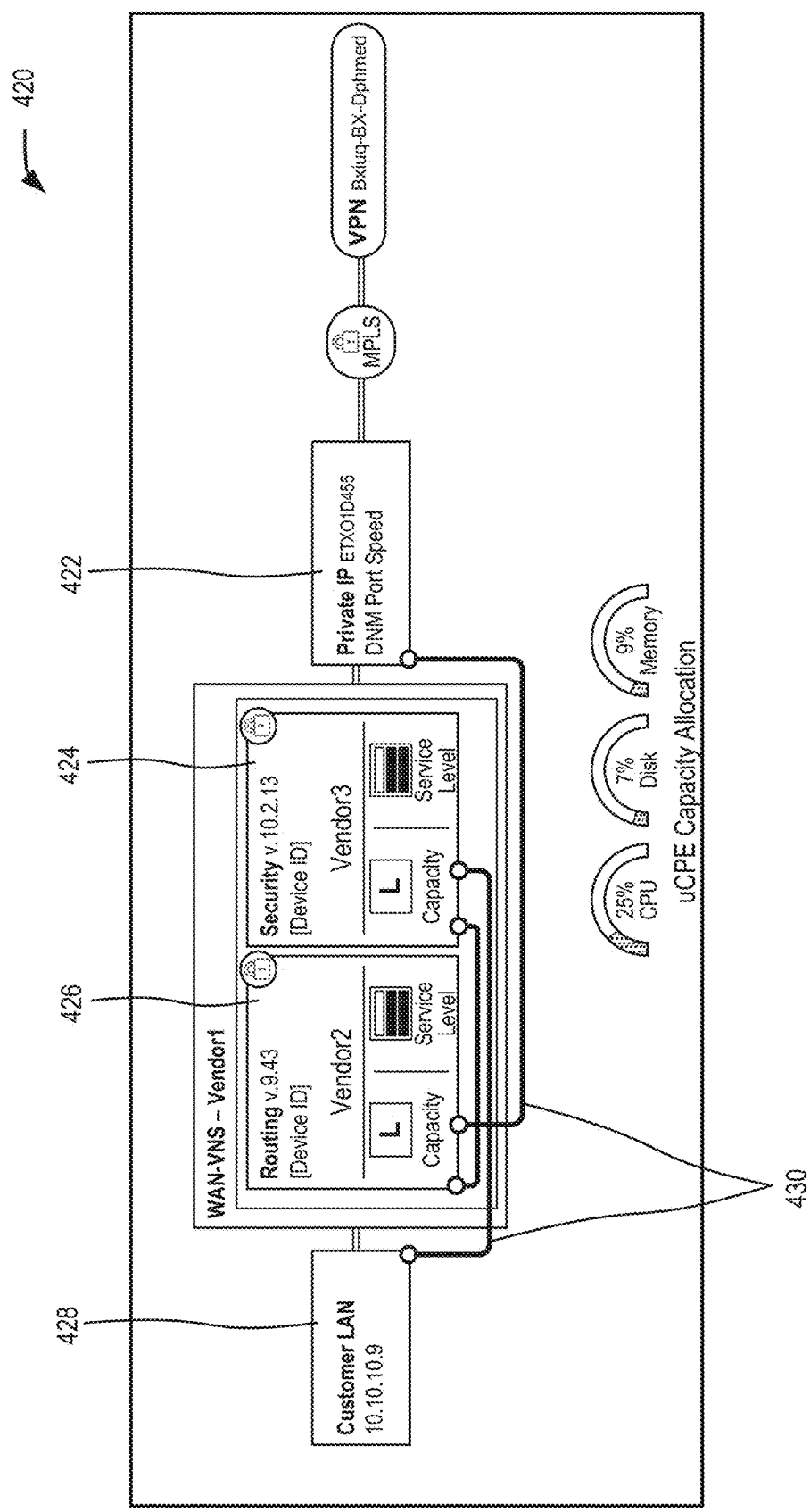

FIG. 4B is an example of a topology view UI 420 of one of the locations selected from radio buttons 412. Topology view UI 420 may represent how the various products in a particular location are interconnected. In the example, of FIG. 4B, topology view UI 420 illustrates connections 430 between a PIP product 422, a security product 424, a routing product 426, and a customer LAN 428 at a selected customer location. In the example, of FIG. 4B, a user may select (e.g., touch or click on) one of the icons for PIP product 422, security product 424, or routing product 426 to review current settings and/or initiate changes.

Figure 4C:
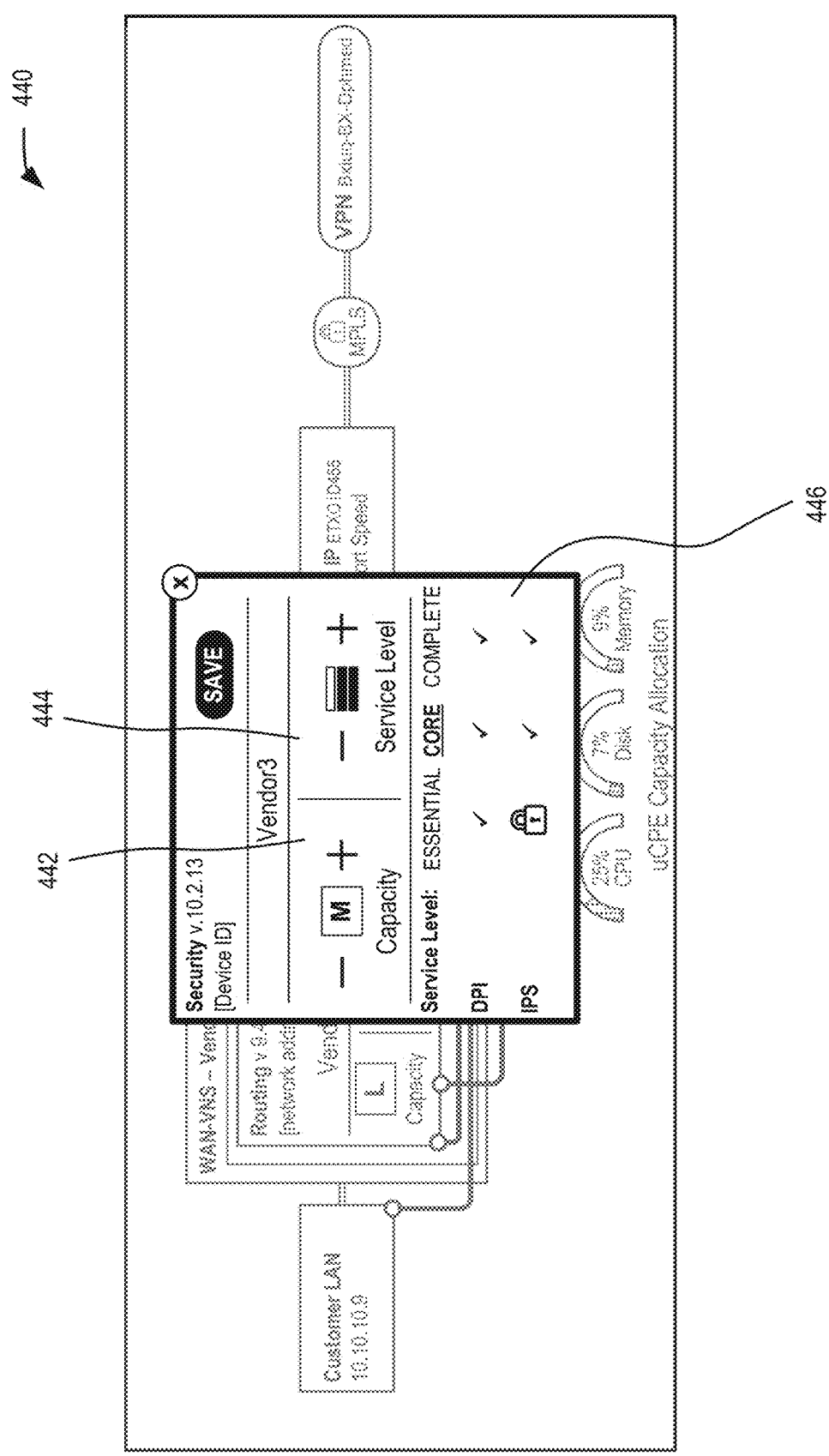

FIG. 4C is an example of a change UI 440 of one of the network products of FIG. 4B. Assume, for example, a user selects the icon of security product 424 from FIG. 4B to cause presentation of change UI 440. Change UI 440 may provide an interface to submit changes dynamically to the selected network product. For example, as shown in change UI 440 a user may adjust the capacity level at capacity section 442 (e.g., to Low (L), Medium (M), or High (H)) and service level at service level section 444 (e.g., to essential, core, complete) for a network security policy. A summary of parameters for a particular section 442/444 may be shown in a parameters section 446. Based on changes selected by a user, the assisted network change service may generate a change request summary.

Figure 4D:
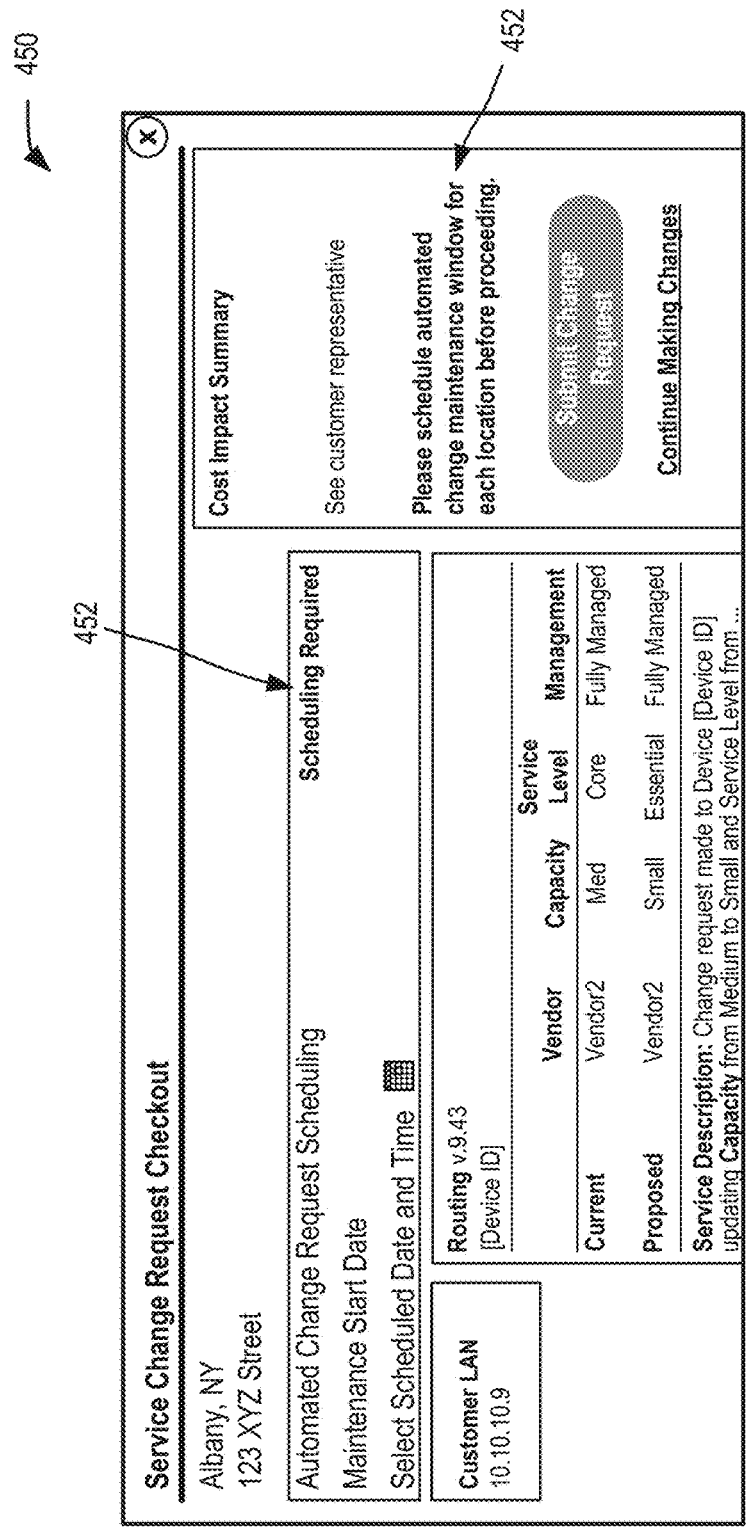

FIG. 4D is an example of a change request summary 450. Change request summary 450 may be automatically generated, for example, by virtual coach 320 for presentation on customer portal 150 based on user input from change UI 440. Change request summary 450 may describe a complete or partially-completed change request. A partially-completed change request may include a change that requires additional actions before the change can be completed. Change request summary 450 may include, for example, one or more recommendations 452 for actions to complete before a change request can be validated. In other implementations, change request summary 450 may include recommendations to optimize other network settings in response to an initial change.

Figure 4E:
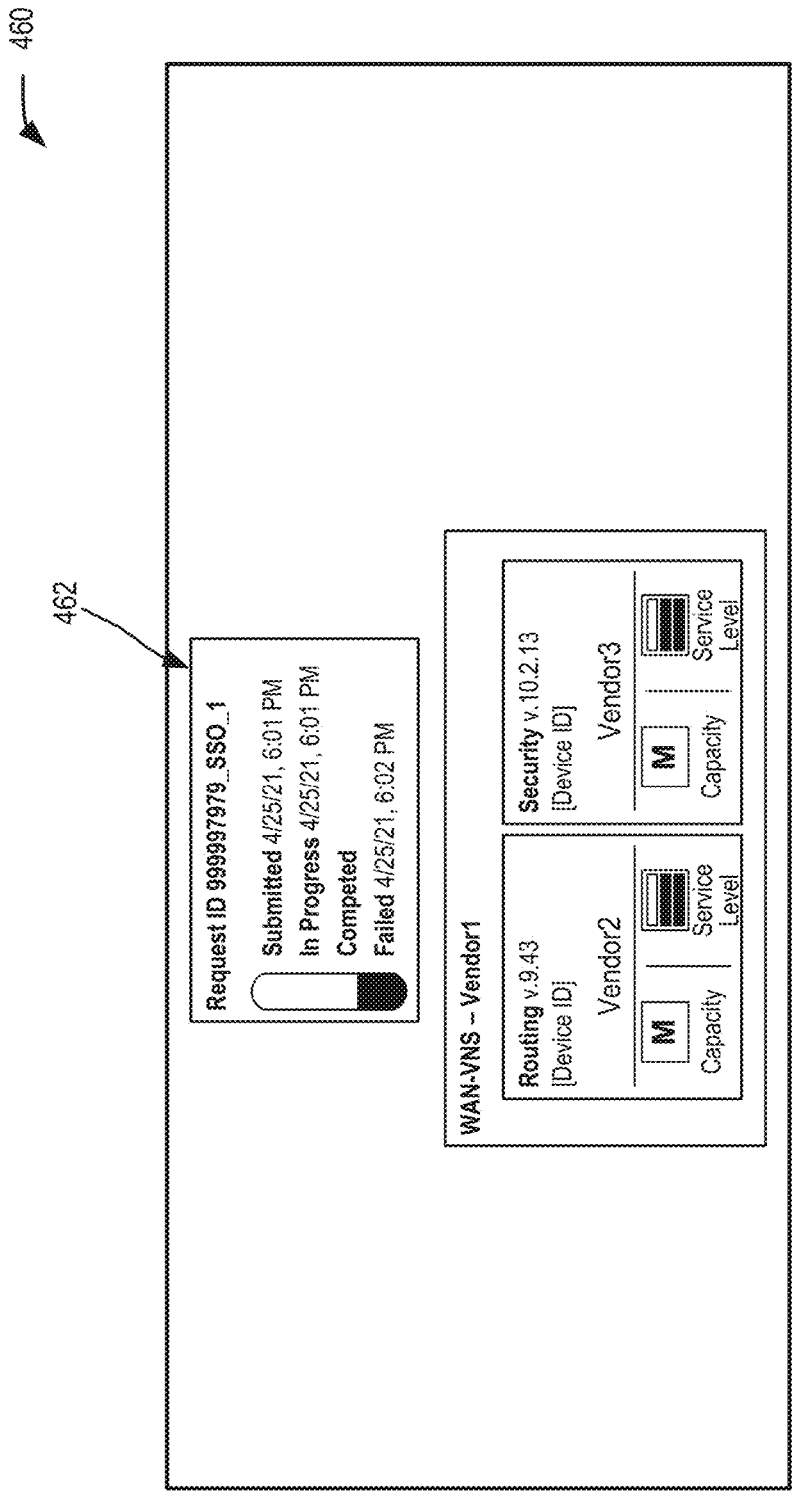

FIG. 4E is an example of a tracking UI 460. Tracking UI 460 may be presented, for example, along with a topology view for a particular network site. Since graph DB 300 is updated in near real-time, a change status 462 may be presented via customer portal 150 with accurate status information for any point in the change order process.

Although FIGS. 4A-4E depict examples of user interface for the assisted network change service, in other implementations, these user interfaces may depict more, less, different and/or differently-arranged information than depicted in FIGS. 4A-4E.

Figure 5:
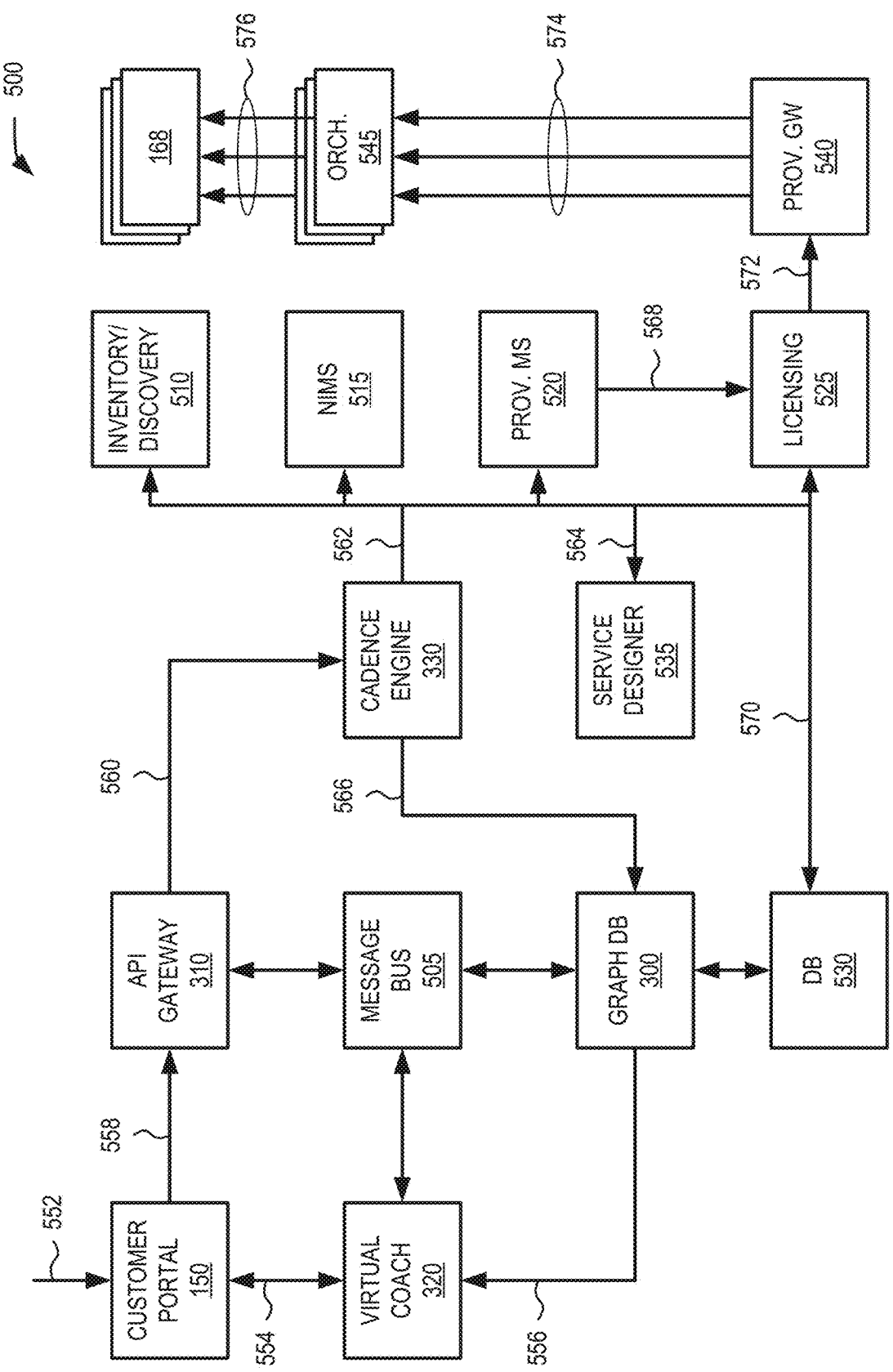
FIG. 5 is a diagram illustrating example communications for implementing an assisted network change service, according to an implementation.

FIG. 5 is a diagram illustrating exemplary communications for implementing the assisted network change service in a portion 500 of network environment 100. FIG. 5 provides simplified illustrations of communications in network portion 500 and is not intended to reflect every signal or communication exchanged between devices/functions.

As shown in FIG. 5, network portion 500 may include customer portal 150, graph DB 300, API gateway 310, virtual coach 320, cadence engine 330, a message bus 505, inventory/discovery system 510, network infrastructure microservice (NIMS) 515, provisioning system 520, licensing system 525, database 530, provisioning gateway (GW) 535, orchestrators 560, and network functions 168. Message bus 505, inventory/discovery system 510, NIMS 515, provisioning system 520, licensing system 525, database 530, provisioning gateway 535, and orchestrators 560 may correspond to one or more of order planning system 130 or network devices 120.

As indicated at reference 552 a user (e.g., a network administrator for enterprise network 160) may log in to access customer portal 150 and select a site, within enterprise network 160, to make changes. As shown at references 554 and 556, virtual coach 320 may retrieve topology information and business rules from graph database 300 to provide to customer portal 150 the site locations (e.g., FIG. 4A) and topologies for selected sites (e.g., FIG. 4B).

The customer may review the site topology and decide to make a change. For example, the customer may adjust a service level using the icon for a particular network function (e.g., FIG. 4C). Virtual coach 320 may dynamically apply business rules retrieved from graph database 300 to verify the customer's requested change. In one implementation, virtual coach 320 may notify the customer (via customer portal 150) of an incompatible configuration (e.g., a "high" service level for routing may be incompatible with a "low" security capacity) and provide recommendations for dependencies that flow from the customer's initial change. Thus, virtual coach 320 may guide the customer through a series of selections to effectively configure changes at the selected site.

Based on the customer selection, customer portal 150 may generate a change request (e.g., FIG. 4D) which may be confirmed by the customer and submitted as an order 558. Order 558 may be sent to API gateway 310. Order 558 may be received by API gateway 310 and forwarded to the appropriate network function (e.g., cadence engine 330), as indicated by reference 560.

Cadence engine 330 may coordinate a workflow and timing to implement the order (e.g., at a scheduled time). For example, as indicated by reference 562, cadence engine 330 may provide various workflow instructions to update inventory (e.g., to inventory/discovery system 510), manage network infrastructure such as IP addresses (e.g., to NIMS 515), initiate provisioning (e.g., to provisioning system 520), and update/confirm software licensing (e.g., to licensing 525). Cadence engine 330 may perform stateful monitoring of the various workflows. In some implementations, cadence engine 330 may automatically adjust workflows for delays encountered by one or more of inventory 510, NIMS 515, provisioning microservice 520, and/or licensing 525. In other implementations, cadence engine 330 may direct alerts or reported problems to service design system 535 for manual resolution, as indicated by reference 564. Cadence engine 330 may also provide feedback 566 to graph database 300 to provide an ongoing status of orders.

Cadence engine 330 and/or provisioning microservice 520 may determine what network components require changes to implement an order. As indicated by reference 568, provisioning microservice 520 may indicate which physical network functions, virtual network functions, and/or PIP/SCI changes are required to deploy the ordered change. Licensing system 525 may receive the change indications and verify or update permission (e.g., number of licensed instances, etc.).

Licensing system 525 may provide a record 570 of the confirmed updates to configuration database 530. Additionally, licensing system 525 may forward instructions 572 to provisioning gateway 540 for distribution to respective orchestrators 545 for physical network functions, virtual network functions, or PIP/SCI. As indicated by reference 574, provisioning gateway 540 may provide instructions to the respective orchestrators 545, which in turn deploy changes 576 in their respective network components to implement the order (e.g., order 558).

Figure 6:
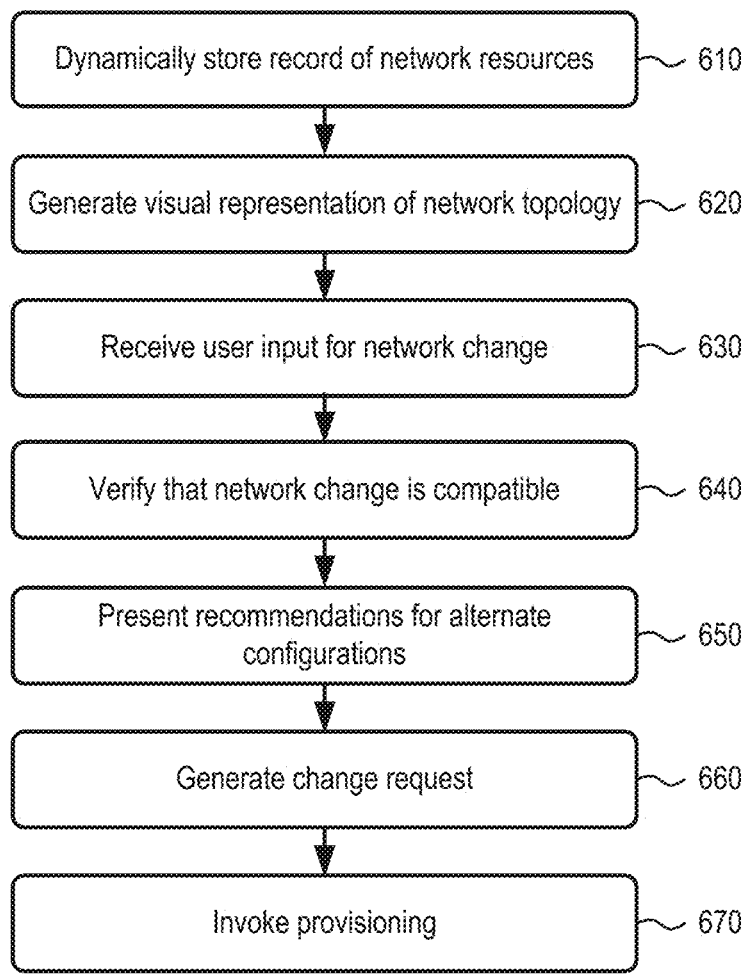
FIG. 6 is a flow diagram illustrating a process for invoking a change using an assisted network change service, according to an implementation.

FIG. 6 is a flow diagram illustrating an exemplary process 600 for invoking a change using an assisted network change service, according to an implementation described herein. In one implementation, process 600 may be implemented by context service framework 140. In another implementation, process 600 may be implemented by context service framework 140 in conjunction with one or more other devices in network environment 100.

Process 600 may include storing a record of network resources for an enterprise network (block 610) and generating a visual representation of the network topology for a selected site of the enterprise network (block 620). For example, graph database 300 may store a linking of all network functions at different sites of each enterprise network 160 supported by provider network 110. Graph database 300 may be updated dynamically as a continuous background process. Users may be presented with a location view (e.g., location view UI 410) of network products deployed at each location of enterprise network 160 and select a particular location for a topology view. Virtual coach 320 may use graph database 300 to present a topology view (e.g., topology view UI 420) of the selected location.

Process 600 may also include receiving input for a change to configuration parameters of one of the network resources (block 630), and verifying if the change to the configuration parameters is compatible with other settings in the enterprise network (block 640). For example, a user may adjust a service level using an icon (e.g., from change UI 440) for a particular network function. As described above, virtual coach 320 may dynamically apply business rules from graph database 300 to verify that the user selected change is compatible with other network function settings.

Process 600 may additionally include presenting a recommendation for different configuration parameters when the change to the configuration parameters is not compatible with other settings in the enterprise network (block 650) and generating a change request based on the configuration parameters (block 660). For example, virtual coach 320 may provide recommended actions and or additional changes that may be necessary to enable a user's selected network change for a particular service. A change request summary (e.g., change request summary 450) may be automatically generated for presentation on customer portal 150. The change request summary may describe a complete or partially-completed change request. For a partial change request, virtual coach 320 may direct that additional steps be completed before permitting a change request to be finalized.

Process 600 may further include automatically invoking provisioning to implement the change request for the enterprise network (block 670). For example, cadence engine 330 may receive a change request submitted via customer portal 150. Cadence engine 330 may provide various workflow instructions to update inventory, modify network infrastructure, initiate provisioning, and update/confirm appropriate licensing. Cadence engine 330 may perform stateful monitoring of the various workflows, adjust the workflows when issues arise, and/or initiate provisioning for successful changes.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 6, and message/operation flows with respect to FIG. 5, the order of the blocks and message/operation flows may be modified in other embodiments. Further, non-dependent blocks may be performed in parallel. Also, while the assisted network change service has been described primarily in the context of assisting changes for enterprise networks, in other implementations, the assisted network change service may be used for customers in other network environments, such customers utilizing MEC networks.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
    storing, by a network device in a provider network, a record of network resources for a customer network;
    generating, based on the record of network resources, a visual representation of a network topology for a selected site of the customer network;
    receiving, from a customer, input for a change to configuration parameters of network resources in the customer network;
    verifying if the change to the configuration parameters is compatible with other settings in the customer network;
    generating, by the network device, a change request order for the customer network based on the input and the verifying;
    providing, by the network device and to one or more other network devices in the provider network, workflow instructions to implement the change request order for the customer network, wherein the workflow instructions include workflow instructions for an inventory system to update inventory, workflow instructions for a network infrastructure microservice to manage Internet Protocol (IP) addresses, workflow instructions for a provisioning microservice to initiate provisioning, and workflow instructions for a licensing system to update a licensing record for the change request order;

performing stateful monitoring of each of the workflow instructions; and automatically pausing one of the workflow instructions when the monitoring indicates a delay of another one of the workflow instructions.

2. The method of claim 1, further comprising:
receiving, from the customer, a selection of a network service from the visual representation; and
presenting, to the customer and in response to the selection of the network service, an interface to change a service level parameter for the selected network service.

3. The method of claim 1, further comprising:
presenting, to the customer, a recommendation for different configuration parameters when the change to the configuration parameters is not compatible with other settings in the customer network.

4. The method of claim 1, wherein generating the visual representation of the network topology further comprises:
generating the visual representation in near real time.

5. The method of claim 1, further comprising:
providing, to the customer, recommendations for additional actions dependencies that flow from the input based on receiving the input for the change to the configuration parameters.

6. The method of claim 1, further comprising:
logging a change request;
detecting a deployment failure for the change request; and
automatically returning, based on the detecting, the customer network to a pre-change configuration.

7. The method of claim 1, further comprising:
presenting, to the customer, a list of sites in the customer network; and
receiving, from the customer, a selection of a site in the customer network.

8. The method of claim 1, wherein storing the record of network resources comprises:
automatically updating the record of network resources to reflect a status of the change request order.

9. One or more network devices, comprising:
one or more processors configured to:
store, in a provider network, a record of network resources for a customer network;
generate, based on the record of network resources, a visual representation of a network topology for a selected site of the customer network;
receive, from a customer, input for a change to configuration parameters of network resources in the customer network;
verify if the change to the configuration parameters is compatible with other settings in the customer network;
generate a change request order for the customer network based on the input and the verifying;
provide, to one or more other network devices in the provider network, workflow instructions to implement the change request order for the customer network, wherein the workflow instructions include workflow instructions for an inventory system to update inventory, workflow instructions for a network infrastructure microservice to manage Internet Protocol (IP) addresses, workflow instructions for a provisioning microservice to initiate provisioning, and workflow instructions for a licensing system to update a licensing record for the change request order;

perform stateful monitoring of each of the workflow instructions; and automatically pause one of the workflow instructions when the monitoring indicates a delay of another one of the workflow instructions.

10. The one or more network devices of claim 9, wherein the one or more processors are further configured to:
receive, from the customer, a selection of a network service from the visual representation; and
present, to the customer and in response to the selection of the network service, a user interface to change a service level parameter for the selected network service.

11. The one or more network devices of claim 9, wherein the visual representation of the network topology includes both virtual network resources and physical network resources.

12. The one or more network devices of claim 9, wherein the one or more processors are further configured to:
present, to the customer, a recommendation for different configuration parameters when the change to the configuration parameters is not compatible with other settings in the customer network.

13. The one or more network devices of claim 12, wherein the one or more processors are further configured to:
present, to the customer, recommendations for dependencies that flow from the input based on receiving the input for the change to the configuration parameters.

14. The one or more network devices of claim 9, wherein the one or more processors are further configured to:
log a change request;
detect a deployment failure for the change request; and
return, based on the detecting, the customer network to a pre-change configuration.

15. The one or more network devices of claim 9, wherein the one or more processors are further configured to:
present, to the customer, a list of sites in the customer network; and
receive, from the customer, a selection of a site in the customer network.

16. The one or more network devices of claim 9, wherein, when storing the record of network resources, the one or more processors are further configured to:
update the record of network resources to reflect a status of the change request order.

17. A non-transitory computer-readable medium containing instructions executable by at least one processor, the computer-readable medium comprising one or more instructions to cause the at least one processor to:
store, in a provider network, a record of network resources for a customer network;
generate, based on the record of network resources, a visual representation of a network topology for a selected site of the customer network;
receive, from a customer, input for a change to configuration parameters of network resources in the customer network;
verify if the change to the configuration parameters is compatible with other settings in the customer network;
generate a change request order for the customer network based on the input and the verifying;
provide, to one or more other network devices in the provider network, workflow instructions to implement the change request order for the customer network, wherein the workflow instructions include workflow instructions for an inventory system to update inventory, workflow instructions for a network infrastructure microservice to manage Internet Protocol (IP) addresses, workflow instructions for a provisioning microservice to initiate provisioning, and workflow instructions for a licensing system to update a licensing record for the change request order;

perform stateful monitoring of each of the workflow instructions; and automatically pause one of the workflow instructions when the monitoring indicates a delay of another one of the workflow instructions.

18. The non-transitory computer-readable medium of claim 17, further comprising instructions to cause the at least one processor to:

receive, from the customer, a selection of a network service from the visual representation; and present, to the customer and in response to the selection of the network service, a user interface to change a service level parameter for the selected network service.

19. The non-transitory computer-readable medium of claim 17, further comprising instructions to cause the at least one processor to:

present, to the customer, recommendations for additional actions dependencies that flow from the input based on receiving the input for the change to the configuration parameters.

20. The non-transitory computer-readable medium of claim 17, further comprising instructions to cause the at least one processor to:

detect a deployment failure for a change request; and return, based on the detecting, the customer network to a pre-change configuration.

\* \* \* \* \*